(12) United States Patent
Lodolo

(10) Patent No.: US 7,735,381 B2
(45) Date of Patent: Jun. 15, 2010

(54) TANGENTIAL METER FOR LIQUIDS

(76) Inventor: Alberto Lodolo, Via B. Strozzi 5/14, 16136 Genova (GE) (IT)

( * ) Notice: Subject to any disclaimer, the term of this patent is extended or adjusted under 35 U.S.C. 154(b) by 685 days.

(21) Appl. No.: 11/631,129

(22) PCT Filed: Jul. 14, 2005

(86) PCT No.: PCT/EP2005/053396

§ 371 (c)(1),
(2), (4) Date: Dec. 27, 2006

(87) PCT Pub. No.: WO2006/010713

PCT Pub. Date: Feb. 2, 2006

(65) Prior Publication Data

US 2009/0151473 A1    Jun. 18, 2009

(30) Foreign Application Priority Data

Jul. 26, 2004    (IT) .......................... MI2004A1505

(51) Int. Cl.
*G01F 1/05*    (2006.01)
*G01F 1/10*    (2006.01)

(52) U.S. Cl. ................................. 73/861.79; 73/861.92
(58) Field of Classification Search ....................... None
See application file for complete search history.

(56) References Cited

U.S. PATENT DOCUMENTS

| 1,670,308 A |   | 5/1928 | Marden |
| 3,518,880 A |   | 7/1970 | Kullman et al. |
| 3,759,100 A |   | 9/1973 | Medwig et al. |
| 4,195,522 A | * | 4/1980 | Anderson et al. ........ 73/861.79 |
| 4,656,873 A |   | 4/1987 | Stewart et al. |
| 5,182,952 A | * | 2/1993 | Pyzik ...................... 73/861.79 |
| 5,721,383 A | * | 2/1998 | Franklin et al. .......... 73/861.77 |
| 5,892,158 A | * | 4/1999 | Franklin et al. .......... 73/861.77 |

* cited by examiner

*Primary Examiner*—Harshad Patel
(74) *Attorney, Agent, or Firm*—Ladas & Parry, LLP

(57) ABSTRACT

A mechanical meter for measuring the quantity of liquid flowing through a pipe (2), comprising an impeller (1) rotatably supported by a saddle (3) positionable on the outer surface of the pipe (2), in which the inner surface of the saddle (3) is arranged to abut, at least by a part thereof, directly against the outer surface of the pipe (2) such as to ensure the same penetration of the impeller (1) into the pipe (2) for each installation.

9 Claims, 4 Drawing Sheets

TANGENTIAL METER FOR LIQUIDS

CROSS-REFERENCE TO RELATED APPLICATIONS

This application is the U.S. National Stage of International Patent Application No. PCT/EP2005/053396, filed on Jul. 14, 2005, which claims priority to Italian Patent Application No. MI2004A001505, filed on Jul. 26, 2004, the disclosure of which is hereby incorporated by reference in its entirety.

The present invention relates to a tangential meter for liquids in accordance with the preamble to the main claim.

The present state of the art mainly comprises two types of mechanical meters for liquids, based on the rotation of an impeller inserted into a pipe through which the liquid flows, namely meters with a helical impeller with its axis of rotation parallel to the flow direction, and tangential meters in which the axis of rotation lies in a plane perpendicular to the flow direction.

Meters with helical impeller foresee the complete insertion of a helical impeller in the liquid flow. The impeller is rotated by the liquid flow, its movement being transmitted to a mechanism which counts the number of revolutions and which, suitably calibrated, indicates the liquid quantity which has flown through the pipe.

The helical impeller, with a central nosepiece and inclined blades that move in a direction substantially perpendicular to the flow direction, locally reduces the flow passage cross-section, and can block the passage of solids entrained by the liquid and be damaged by them. In contrast, tangential meters comprise an impeller which partly projects into a flanged pipe and has an axis lying in a plane substantially normal to the pipe axis. Again in this case the impeller is rotated by the liquid flow, its movement being transmitted to a metering box which counts the number of revolutions and which, suitably calibrated, indicates the liquid quantity which has flown through the pipe. In tangential meters only part of the impeller is immersed in the liquid flow, and its blades, by moving with the liquid flow, do not produce an appreciable variation in the pipe cross-section. Moreover, as tangential meters leave a large part of the cross-section free and have only parts of their blades immersed in the fluid to move with it, they allow passage of solid bodies entrained by the liquid such as pieces of wood or stones, without being particularly damaged by these.

All tangential and helical meters are factory calibrated and then mounted.

All tangential meters and many meters with a helical impeller comprise a flanged pipe piece into which the impeller is inserted. Inserting a meter with a flanged pipe piece into an existing pipe is relatively complicated, as a pipe portion of the same length as the flanged pipe piece of the meter has to be cut away and be provided with flanges equal to those of the meter.

To obviate this installation problem, it has been considered to mount the meter on a saddle support. In this case, a circular hole of suitable size is made in the pipe, generally with a milling cutter, the saddle of the meter is disposed on the pipe, with a gasket in the form of a pad with a central hole interposed between the saddle and pipe, and the impeller inserted into the pipe through the hole, after which a number of tie rods surrounding the pipe are tightened to lock the saddle in position. However only meters with a helical impeller are currently produced with this saddle support. Factory tests have shown that tangential meters with a saddle support very often give wrong results.

The object of the present invention is therefore to provide a tangential meter with a saddle-mounting device without this drawback, i.e. which provides correct results. Said object is attained by a tangential meter with a saddle-mounting device, the main characteristics of which are specified in the first claim, other characteristics being specified in the remaining claims.

The invention will be more apparent from the ensuing description, given by way of non-limiting example, of two preferred embodiments illustrated in the accompanying drawings, in which.

After certain studies, it was discovered that the cause of the wrong results provided by tangential meters with a saddle-mounting device is the fact that the tangential impeller, by penetrating only partly into the pipe through a hole suitable provided in the pipe for mounting the meter, is influenced by the turbulent motion created in proximity to the hole and by the fluid threads close to the pipe inner wall which present a strong velocity gradient. In this respect the edge of the hole forms a step, or in other words a discontinuity, which generates turbulent motion. For this reason, the movement of the impeller and the value measured by a saddle-mounted meter with a tangential impeller is influenced by the distance of the impeller from the edge of the hole, by the thickness of the pipe, by the depth of penetration of the impeller into the liquid flow, and by any possible local variation in the pipe cross-section due to the insertion of fixed parts of the meter into the flow.

These parameters, in particular the variation in the pipe cross-section due to the insertion of fixed parts of the meter into the flow, vary with its installation, which is usually done by non-specialized personnel in uncomfortable environmental situations.

To obviate these technical problems which have now been identified, the tangential meter is constructed such that the inner surface of the saddle abuts against the outer surface of the pipe so that penetration of the impeller and deflector into the pipe, which modifies the cross-section available for liquid passage and hence its local velocity, is equal for each installation. This result is obtained by making a suitable seat for the gasket. Moreover, the meter of the present invention comprises one or more deflectors disposed in front of and preferably about the impeller to protect it from the fluid threads which flow along the inner wall of the pipe and from the vortices created close to the edge of the hole provided in the pipe for insertion of the impeller.

As the tangential meter is provided with a saddle-mounting device and can be factory calibrated, the advantage is obtained of achieving a tangential meter with a practical and rapid installation system which enables the quantity of liquid flowing through the pipe on which it is mounted to be measured without calibration after installation.

Figure 1:
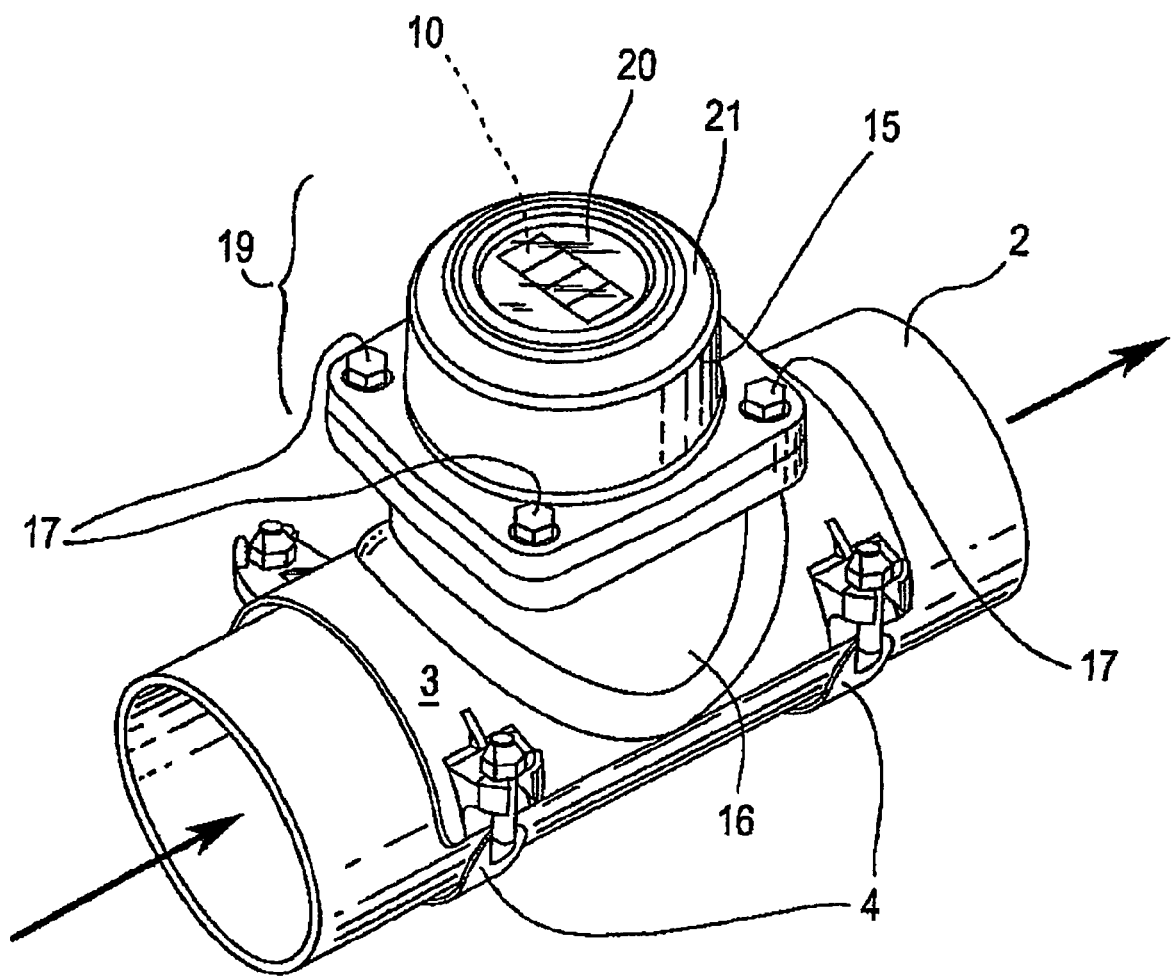
FIG. 1 is a perspective view of a tangential meter according to the invention mounted on the pipe.

FIG. 1 is a perspective view of a tangential meter with a saddle-mounting device mounted on a pipe 2 through which a liquid flows in the direction indicated by the arrows. The meter comprises a saddle 3 surmounted by a hollow body 16 on which a measurement member 19 is disposed extending into the hollow body 16 and fixed to it by screws 17. The measurement member 19 presents upperly a cover 21. Normally lead sealed to prevent tampering in measuring the liquid quantity delivered, and provided with a window 20 through which the number displayed by a metering box 10 disposed inside the measurement member 19 can be read. The meter also comprises clamping means 4, for example tie rods, which lock the saddle 3 by pressing it against the outer wall of the pipe 2.

Figure 2:
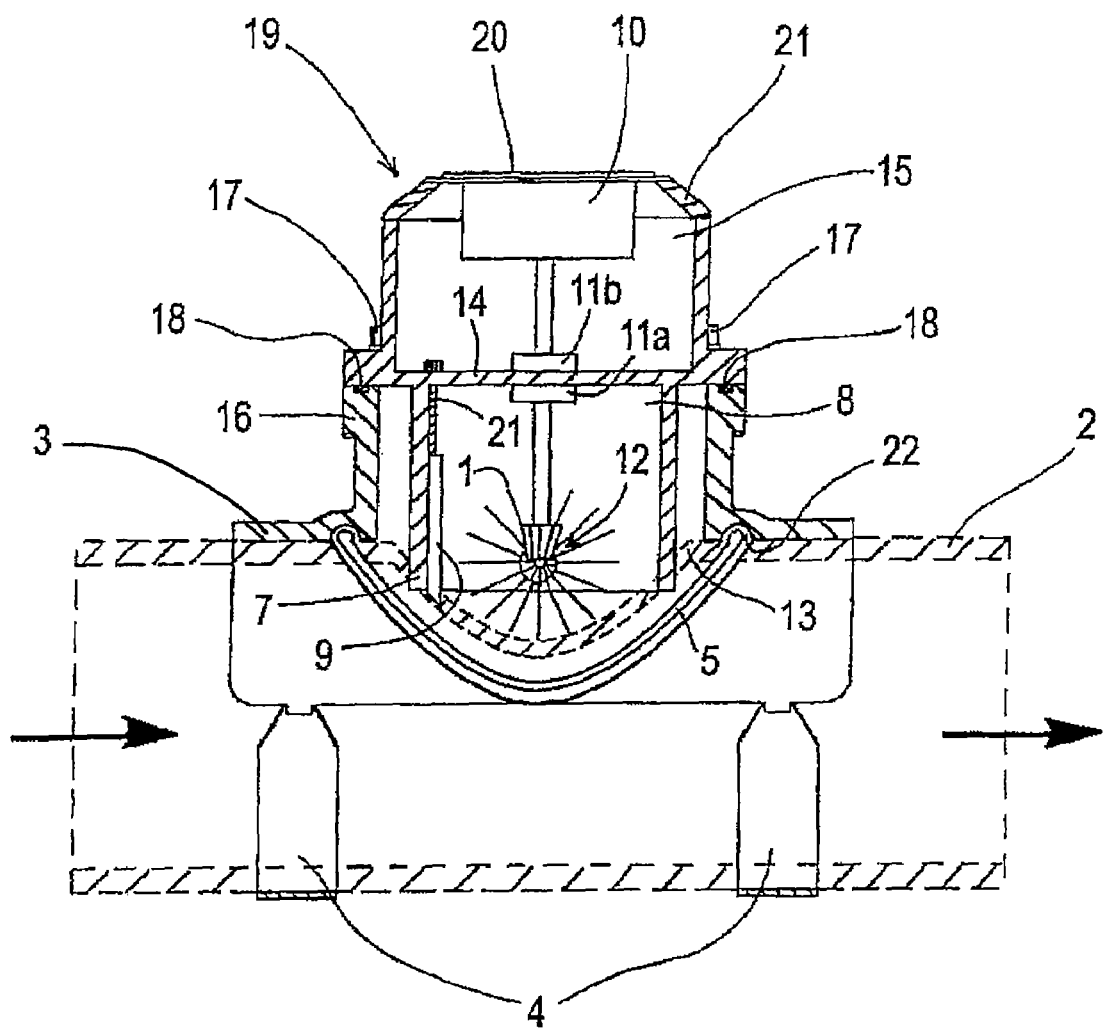
FIG. 2 is a longitudinal section through a first embodiment of the tangential meter of the invention.

With reference to the longitudinal section of FIG. 2, it can be seen that the tangential meter comprises an impeller 1 disposed such as to project into a pipe 2, here shown by dashed lines for clarity, on which the meter is mounted, the axis of rotation of the impeller lying in a plane normal to the axis of said pipe 2, which when the meter is mounted coincides with the axis of the saddle 3. The saddle 3 presents at least a part of its inner surface complementary to the outer surface of the pipe 2 and hence abutting thereon. The means 4 for clamping the saddle 3 on the pipe 2 both lock the saddle, which is pressed against the outer wall of the pipe 2, and seal it by the presence of a gasket 5 of O-ring type disposed in a suitable seat 22. When clamping is complete, the gasket 5 totally enters its seat 22 to cause the inner surface of the saddle 3 to directly abut against the outer surface of the pipe 2. In FIG. 2 it is assumed that the liquid flows into the pipe from left to right in the direction indicated by the arrows. The meter also comprises a housing 8 enclosing the upper part of the impeller 1 and acting in some cases as a support for the impeller shaft. The end part 7 of the housing 8, which extends into the pipe 2 in front of the impeller 1, acts as a deflector, the purpose of which is to partly protect the impeller 1 so that it is not directly struck by the fluid threads which flow in proximity to the wall of the pipe 2 or by the vortices created in the edge of the hole 13 provided in the pipe 2. Advantageously, as in FIG. 2, the deflector 7 completely surrounds the impeller to form a collar which also protects it from transverse turbulent movements. The deflector 7 itself creates turbulence which influences the impeller 1, but this turbulence is substantially independent of the position of the impeller 1 relative to the edge of the hole 13 in the pipe 2 and hence independent of the installation. For fine calibration of the meter within the factory, said deflector 7 can be made movable along a direction radial to the pipe 2 or alternatively, as shown in FIG. 2, the meter can comprise a further movable deflector 9 disposed in a position which can be varied in height in front of the impeller 1, by a screw adjustment system 21. The measurement member 19 comprises both a housing 15 for the metering box 10 and the housing 8 for the impeller 1, the two housings being separated by a wall 14. The metering box 10 is disposed within the housing 15 closed by the cover 21 by means of a lead seal to prevent tampering. It is of mechanical type in order not to require the use of electric current and serves to meter and display the quantity of liquid which has flown through that section of the pipe 2, and can be read by the operator through the window 20. The metering box 10 is driven by a magnetic element 11b coupled, via the wall 14, to the magnetic element 11a which is driven by the impeller 1 via gears 12. The seal between the metering member 19 and the hollow body 16 is provided by a second gasket 18.

Figure 3:
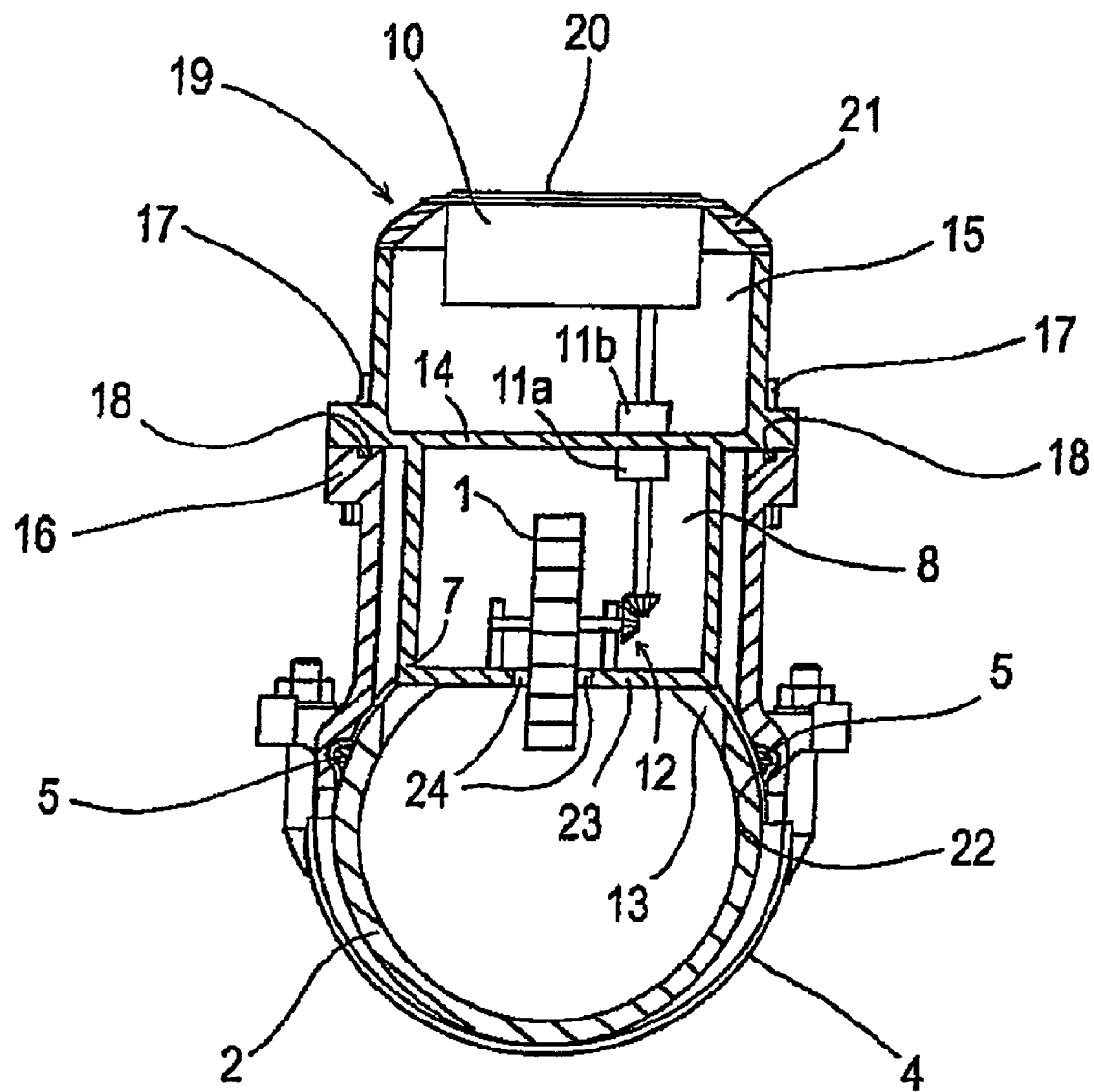
FIG. 3 is a cross-section through the first embodiment of the tangential meter.

FIG. 3 shows a cross-section through the meter in which for manufacturing simplicity the lower part of the housing 8, by penetrating into the pipe 2, acts as the deflector 7. In this case, to protect the top part of the impeller from the vorticity of the liquid flow, the housing 8 is also closed lowerly by a wall 23 in which a long narrow hole 24 is provided, through which the impeller is inserted into the liquid flow. For this embodiment, the extent of penetration of the deflector 7 into the pipe 2 is extremely critical, in that the pipe cross-section is reduced and the local liquid velocity varies as a consequence, to produce wrong results. To ensure that installation is always such as to produce the same penetration of the deflector 7 into the pipe 2, and hence the same passage cross-section, the inner surface of the saddle 3 is formed so that it directly abuts, at least with some of its parts, against the outer surface of the pipe 2. For this purpose, on that surface of the saddle 3 facing the outer surface of the pipe 2 a gasket 3, preferably an O-ring, is present in a suitable seat 22. During installation, the clamping means 4 are tightened until the inner surface of the saddle 3 abuts against the outer surface of the pipe 2, to urge the gasket 5 completely into its seat 22 and hence both provide the seal and ensure that the penetration of the deflector 7 into the pipe 2 is always constant.

Figure 4:
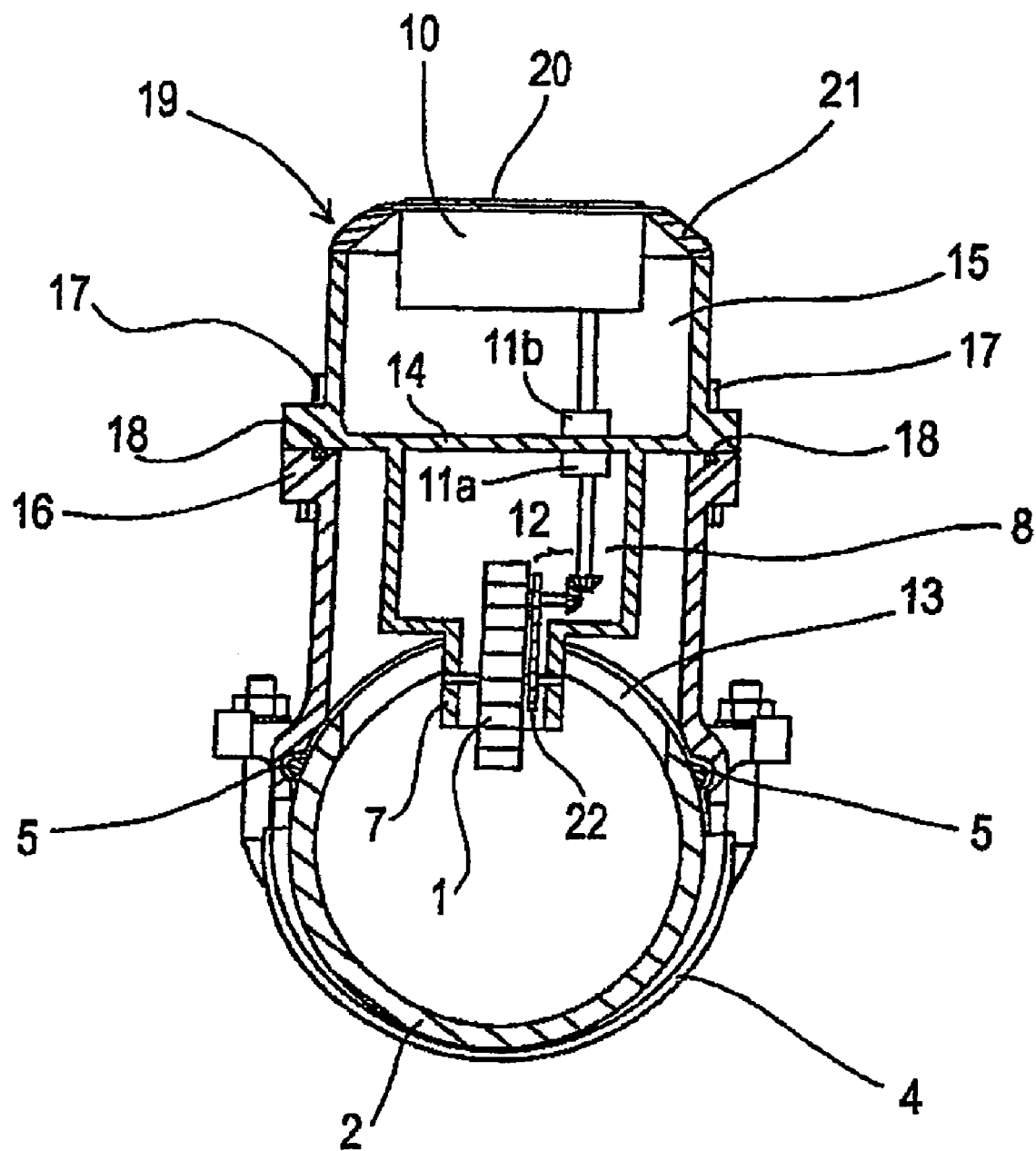
FIG. 4 is a cross-section through a second embodiment of the meter.

With reference to FIG. 4, in a second embodiment in which equal or similar elements are indicated by the same numerals, the deflector 7 is shaped narrow and long to surround the impeller 1 and result in a small reduction in the liquid passage cross-section. If the shaft of the impeller 1 is disposed outside the inner perimeter of the pipe 2, the deflector 7 surrounding the impeller 1 can be very narrow and provide little resistance to liquid movement. If instead, as in FIG. 4, in order to bring the impeller 1 into contact with fluid threads closer to the axis of the pipe 2 the shaft of the impeller 1 is disposed lower so that it intersects the ideal inner perimeter of the pipe 2, in order to reduce the cross-section the gears 12 can comprise a gearwheel 22 keyed onto the shaft of the impeller 1 to transmit movement upwards into the housing 8, where the movement is then transmitted to the magnetic element 11a and to the metering box 10.

Each meter must be calibrated in the factory before assembly by suitably positioning the movable calibration deflector 9.

Each saddle-mounting meter is suitable for pipes of a determined diameter and a determined thickness, its use on a pipe of different diameter or thickness possibly giving rise to problems such as a poor seal or wrong measurement.

The meter of the invention can also function if the impeller 1 does not have an axis lying in a plane exactly perpendicular to the axis of the pipe 2, provided that the meter is suitably calibrated and the impeller is supported adequately to oppose the consequent axial thrusts.

The invention is particularly useful if wishing to fit a tangential meter onto a pipe forming part of an already existing line. To do this it is sufficient to interrupt the liquid flow, form a hole in the pipe 2, fit the saddle 3 onto the pipe 2 with the impeller 1 and deflector 7 through the hole so that they penetrate into the pipe 2, pass the clamping means 4 about the pipe 2 and finally tighten the clamping means 4 until the inner surface of the saddle 3 abuts, at least with some of its parts, against the outer surface of the pipe 2. The gasket 5 pressed between the saddle 3 and the outer surface of the pipe 2 ensures a tight seal, and by totally fitting into its seat 22 ensures that for each correct installation the immersed parts of the meter penetrate to the same extent into the flow.

As the movement of the impeller 1 is transmitted to the metering box 10 by a magnetic coupling between the magnetic elements 11a and 11b, the impeller housing 8 can be completely closed upwards and the metering box 10 be absolutely separate from the liquid flowing through the pipe. This solution does not require an electricity supply, and provides a meter which is exclusively mechanical and therefore particularly robust.

Variants and/or additions can be made by the expert of the art to the embodiments of the invention described and illustrated herein while remaining within the scope of the invention.

The invention claimed is:

1. A mechanical meter for measuring the quantity of liquid flowing through a pipe, comprising an impeller rotatably supported by a saddle positionable on the outer surface of the pipe, the inner surface of the saddle being arranged to abut, at least by a part thereof, directly against the outer surface of the pipe such as to ensure the same penetration of the impeller into the pipe for each installation, said impeller being of tangential type, when the meter is mounted on the pipe, said impeller partly projecting into the pipe, one or more deflectors being arranged to penetrate into the pipe through the hole provided in this latter and disposed in front of the impeller, at least one of said deflectors being disposed about the impeller to form a collar from which the impeller partly emerges, and at least one of said deflectors being a movable deflector.

2. A meter as claimed in claim 1, comprising means for clamping the saddle onto the pipe.

3. A meter as claimed in claim 2, wherein when the saddle is mounted on the pipe and the clamping means have been tightened, a gasket is urged completely into its seat.

4. A meter as claimed in claim 1, comprising, on that inner part of the saddle facing the pipe, a gasket disposed in a seat.

5. A meter as claimed in claim 1, wherein said movable deflector can slide radially.

6. A meter as claimed in claim 1, comprising gears for driving a metering box via magnetic elements and coupled together.

7. A meter as claimed in claim 1, wherein a metering box is disposed in a housing completely separated from the impeller housing by the wall.

8. A mechanical meter for measuring the quantity of liquid flowing through a pipe, the mechanical meter comprising:
    a saddle positionable on an outer surface of a pipe;
    an impeller of tangential type rotatably coupled with the saddle, the impeller being positioned to at least partly project into the pipe when the saddle is mounted on or abutted against the pipe; and
    a movable deflector coupled with the saddle, the movable deflector being positioned to form a collar about the impeller and at least partly penetrate into the pipe when the saddle is mounted on or abutted against the pipe.

9. The mechanical meter of claim 8, wherein the movable deflector is configured to slide radially.

\* \* \* \* \*